United States Patent
Matsen et al.

(10) Patent No.: US 8,056,800 B2
(45) Date of Patent: Nov. 15, 2011

(54) SYSTEMS AND METHODS FOR CONFIGURATION MANAGEMENT

(75) Inventors: Marc R. Matsen, Seattle, WA (US);
Brian K. Ramberg, Everett, WA (US);
Gloria J. Nickson, Pacific, WA (US);
David B. Blackwell, Seattle, WA (US);
Mahesh G. Seetharamu, Bangalore (IN); Rajesh Doda, Renton, WA (US);
Everett Westerman, Auburn, WA (US);
Karl L. Johnson, Seattle, WA (US)

(73) Assignee: The Boeing Company, Chicago, IL (US)

(*) Notice: Subject to any disclaimer, the term of this patent is extended or adjusted under 35 U.S.C. 154(b) by 1447 days.

(21) Appl. No.: 11/173,806

(22) Filed: Jun. 30, 2005

(65) Prior Publication Data

US 2007/0000991 A1 Jan. 4, 2007

(51) Int. Cl.
*G06F 7/00* (2006.01)
(52) U.S. Cl. ............. 235/376; 340/10.3; 340/572.1; 235/385; 235/492; 235/451; 705/28

(58) Field of Classification Search .............. 235/376
See application file for complete search history.

(56) References Cited

U.S. PATENT DOCUMENTS

| | | | |
|---|---|---|---|
| 6,590,834 B1 | 7/2003 | Highfill | |
| 6,748,224 B1 | 6/2004 | Chen et al. | |
| 6,812,824 B1 | 11/2004 | Goldinger et al. | |
| 2005/0046584 A1* | 3/2005 | Breed | 340/825.72 |
| 2005/0230478 A1* | 10/2005 | Chapman et al. | 235/462.13 |
| 2005/0253722 A1* | 11/2005 | Droms et al. | 340/572.1 |
| 2006/0097057 A1* | 5/2006 | Porad | 235/492 |
| 2006/0255945 A1* | 11/2006 | Egbert | 340/572.7 |
| 2008/0191004 A1* | 8/2008 | Nakamura | 235/376 |

\* cited by examiner

*Primary Examiner* — Steve S Paik
*Assistant Examiner* — Tae Kim

(57) ABSTRACT

Systems and methods for configuration management in an article of manufacture disclosed. In one embodiment, a system for documenting a configuration of an article of manufacture includes an identifier positioned on the article of manufacture. A local positioning system is used to determine a positional location of the identifier on the article of manufacture. A multifunction apparatus configured to interactively communicate with the identifier and the local positioning system is present that is operable to communicate configuration information to the identifier.

15 Claims, 5 Drawing Sheets

SYSTEMS AND METHODS FOR CONFIGURATION MANAGEMENT

FIELD OF THE INVENTION

This invention relates generally to information management, and more particularly, to systems and methods for configuration management in commercial products.

BACKGROUND OF THE INVENTION

Complex articles of manufacture frequently include a plurality of component parts that cooperatively form the desired article. In general, the number of component parts in the product may range from a few hundred parts to many thousands of parts. Various fixtures, tooling, test equipment, templates and other similar devices may also be used during assembly of the various component parts into the desired article. Accordingly, the production of complex articles of manufacture constitutes a highly disciplined process requiring extensive coordination and documentation to ensure that the component parts, tooling and manufacturing processes conform to accepted standards to yield a product that is structured and performs as designed.

For example, and referring in particular to commercial aircraft production, a configuration control system is typically used to verify that the aircraft conforms to a common product design in accordance with a production type certificate. In particular, it is necessary to verify and document the presence and status of selected critical components on the airplane. Currently, verification that the selected components are properly installed on the airplane is accomplished by a visual inspection, and the results of the visual inspection are documented in a paper-based documentation system maintained by a manufacturer. Following delivery of the airplane, verification that the airplane conforms to a predetermined configuration is also necessary, since the airplane is subject to various repairs, maintenance procedures and inspections while in service. Since the aircraft may also incorporate various approved modifications as described in service bulletins, or other similar documents, the configuration may change in various respects, while the aircraft is in service. Accordingly, the aircraft may obtain an "as flying" configuration that differs from an "as delivered" configuration. Airlines must document the "as flying" configuration of the aircraft during its operational lifetime, and generally rely on a paper-based documentation system to record the "as flying" configuration.

Current configuration control systems for aircraft have various shortcomings. For example, current configuration control systems generally entail visual inspections of various components of the aircraft, which may include a labor-intensive disassembly of the article. Furthermore, paper-based documentation systems may include inaccuracies and are also generally labor-intensive to maintain. Therefore, novel systems and methods to manage the configuration of a manufactured article that reduce the labor required to manage the configuration, and that reduce or eliminate paper-based documentation, would have utility.

SUMMARY

The present invention comprises systems and methods for configuration management in an article of manufacture. In one aspect, a system for documenting a configuration of an article of manufacture includes an identifier positioned on the article of manufacture. A local positioning system is used to determine a positional location of the identifier on the article of manufacture. A multifunction apparatus configured to interactively communicate with the identifier and the local positioning system is present that is operable to communicate configuration information to the identifier.

BRIEF DESCRIPTION OF THE DRAWINGS

Embodiments of the present invention are described in detail below with reference to the following drawings.

DETAILED DESCRIPTION

The present invention relates to systems and methods for configuration management in commercial products. Many specific details of certain embodiments of the invention are set forth in the following description and in FIGS. 1 through 6 to provide a thorough understanding of such embodiments. One skilled in the art, however, will understand that the present invention may have additional embodiments, or that the present invention may be practiced without one or more of the details described in the following description.

Figure 1:
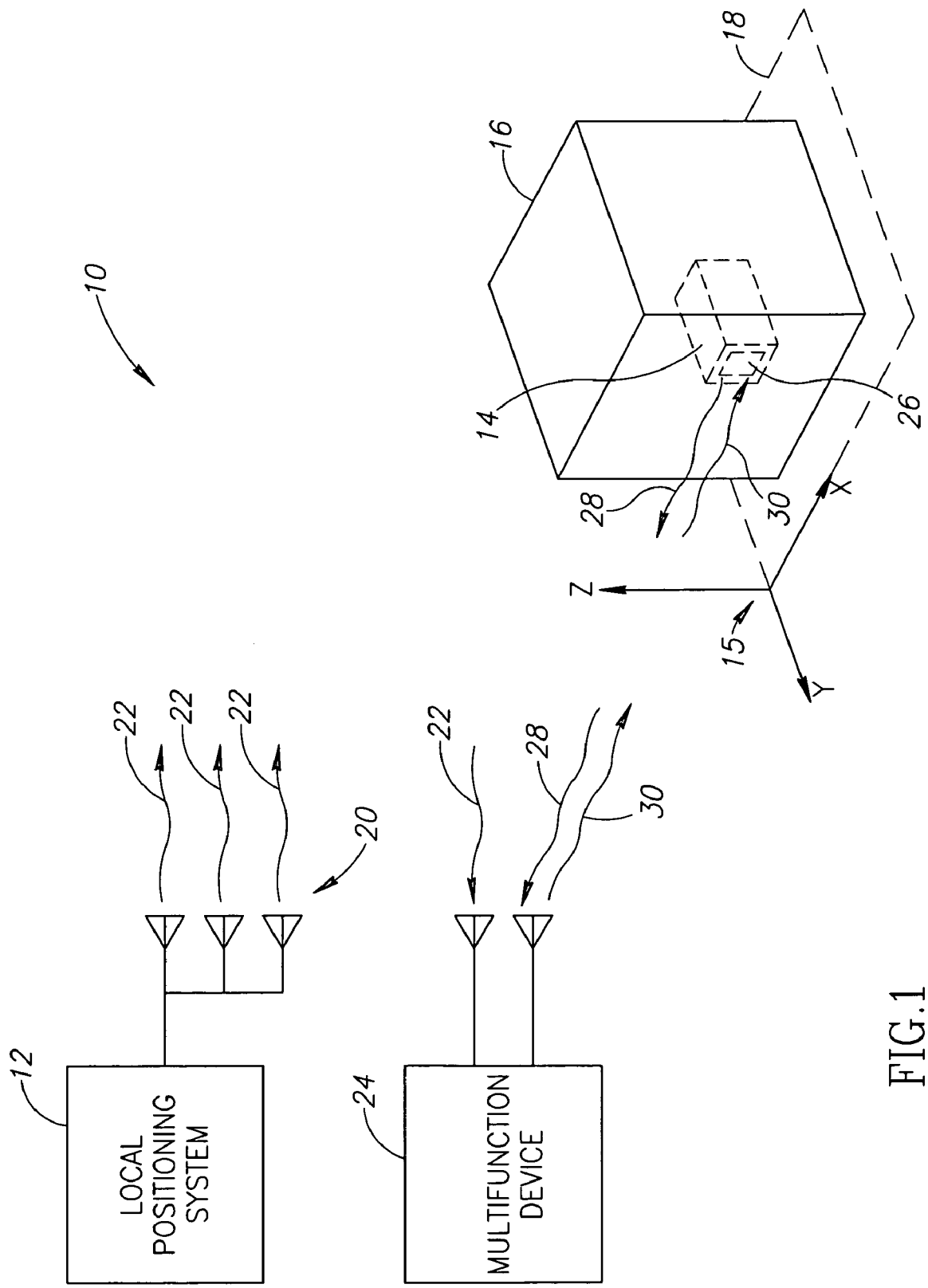
FIG. 1 is a block diagrammatic view of a system for documenting the configuration of an article of manufacture, according to an embodiment of the invention.

FIG. 1 is a block diagrammatic view of a system 10 for documenting a configuration of an article of manufacture, according to an embodiment of the invention. The system 10 includes a local positioning system (LPS) 12 that is operable to accurately determine positional locations of a component portion 14 of an article of manufacture 16 when the article 16 is positioned within a predetermined area 18. Accordingly, the LPS 12 may include any suitable device that is configured to determine the positional location of the component portion 14 relative to a selected coordinate system 15 by time difference of arrival (TDOA), angle of arrival (AOA), received signal strength (RSS) or time of arrival (TOA) methods. In a particular embodiment of the present invention, the LPS 12 includes one or more radio frequency devices that are coupled to a plurality of antennas 20 that are physically spaced apart to allow positional determinations of the component portion 14 to be effected by triangulation methods. The LPS 12 is further operable to communicate signals 22 to an LPS receiver positioned within a multifunction device 24, which will be described in greater detail below.

The component portion 14 of the article of manufacture 16 includes an identifier 26 that is typically positioned on an external surface of the component portion 14. The identifier 26 includes optical encoding features that may be read by a suitable optical reading device, and a transponder device that is operable to communicate signals 28 to the multifunction device 24 in response to interrogating signals 30 emitted by the multifunction device 24. Although the article of manufacture 16 of FIG. 1 shows a single component portion 14, it is understood that the article 16 typically includes a plurality of component portions 14, which may include substantially identical components, generally similar components, or entirely dissimilar components. In any case, the identifier 26 is configured to uniquely identify the component portion 14, and to provide a data storage capability. The identifier 26 will also be described in greater detail below.

Figure 2:
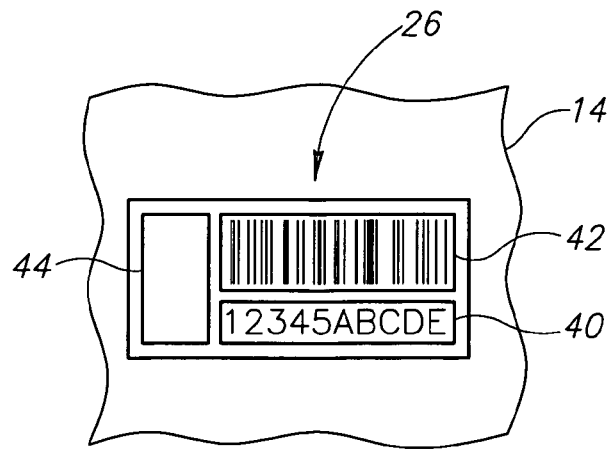
FIG. 2 is a plan view of the identifier shown in FIG. 1, according to another embodiment of the invention.

Turning now to FIG. 2, the identifier 26 of FIG. 1 will now be discussed in detail. The identifier 26 is coupled to a surface location on the component portion 14. Accordingly, the identifier 26 may be positioned on a flexible substrate having an adhesive backing, so that the identifier 26 may be permanently affixed to the surface portion of the component portion 14. Alternately, the identifier may form a portion of an identification plate that is affixed to the surface portion using rivets, permanent adhesives, or other known attachment methods.

The identifier 26 may include an alphanumeric field 40 that includes one or more alphanumeric characters that may be used to identify a selected characteristic of the component portion 14. For example, the alphanumeric field 40 may include a part number, a serial number or a drawing number for the component portion 14, although other information associated with the component portion 14 may also be included in the alphanumeric field 40. The identifier 26 may also include a machine-readable graphic field 42, so that selected characteristics of the component portion 14 are presented in a suitable format that may be read by an optical scanning device. For example, the machine-readable graphic field 42 may include a "bar code" that is operable to encode data in widths and spacings of printed parallel lines. Alternately, the machine-readable graphic field 42 may include any other suitable data or information, including, encoding data in patterns of dots, concentric circles, and may further include encoded data that is hidden in images.

Still referring to FIG. 2, the identifier 26 also includes a transponder device 44 that is operable to emit signals 28 (shown in FIG. 1) in response to an interrogating signal 30 (also shown in FIG. 1). Accordingly, in one particular embodiment, the transponder device 44 may include a radio frequency identification (RFID) device. The RFID device may be an active or a passive device, and may include a memory device. Briefly, and in general terms, passive RFID devices do not include an integral power supply, and rely upon a small electrical current induced in an antenna within the RFID device during interrogation to provide sufficient power to enable the passive RFID device to emit a responsive signal. In contrast, an active RFID device includes an integral source of electrical power, such as a battery. Accordingly, active RFID devices generally exhibit greater radio ranges and may possess larger memories than passive RFID devices. For example, presently available active RFID devices may have practical radio ranges up to several meters, and have a battery life of more than several years. Accordingly, particular embodiments of the present invention may include active and passive RFID devices, and the memory device present within the RFID device may be configured as "read only" memory device. Alternately, the memory device may be configured as a "read/write" enabled memory device.

Passive and active RFID devices may also utilize various operating frequencies. For example, low-frequency (LF) RFID devices are known, and commonly use one of two selected frequencies, which include 125 kilohertz (kHz) and 134.5 kHz. High-frequency (HF) RFID devices are also known and are configured to operate at a frequency of about 13.56 megahertz (MHz). Still other RFID devices are known, and operate at still other frequencies, including ultra high frequency (UHF) ranges, which may include about 868 to about 956 MHz, and microwave frequencies, including about 2.45 gigahertz (GHz). Particular embodiments of the present invention may include RFID devices that operate within any of the foregoing frequency ranges. One suitable RFID device is the INTELLITAG 500 RFID tag, available from Intermec Technologies Corporation of Everett, Wash., although other suitable alternatives exist. Still other transponder devices 44 may be also be used. For example, infrared identification (IRID) devices are also known, and typically emit signals at infrared frequencies to permit the IRID device to communicate with an interrogating device.

Figure 3:
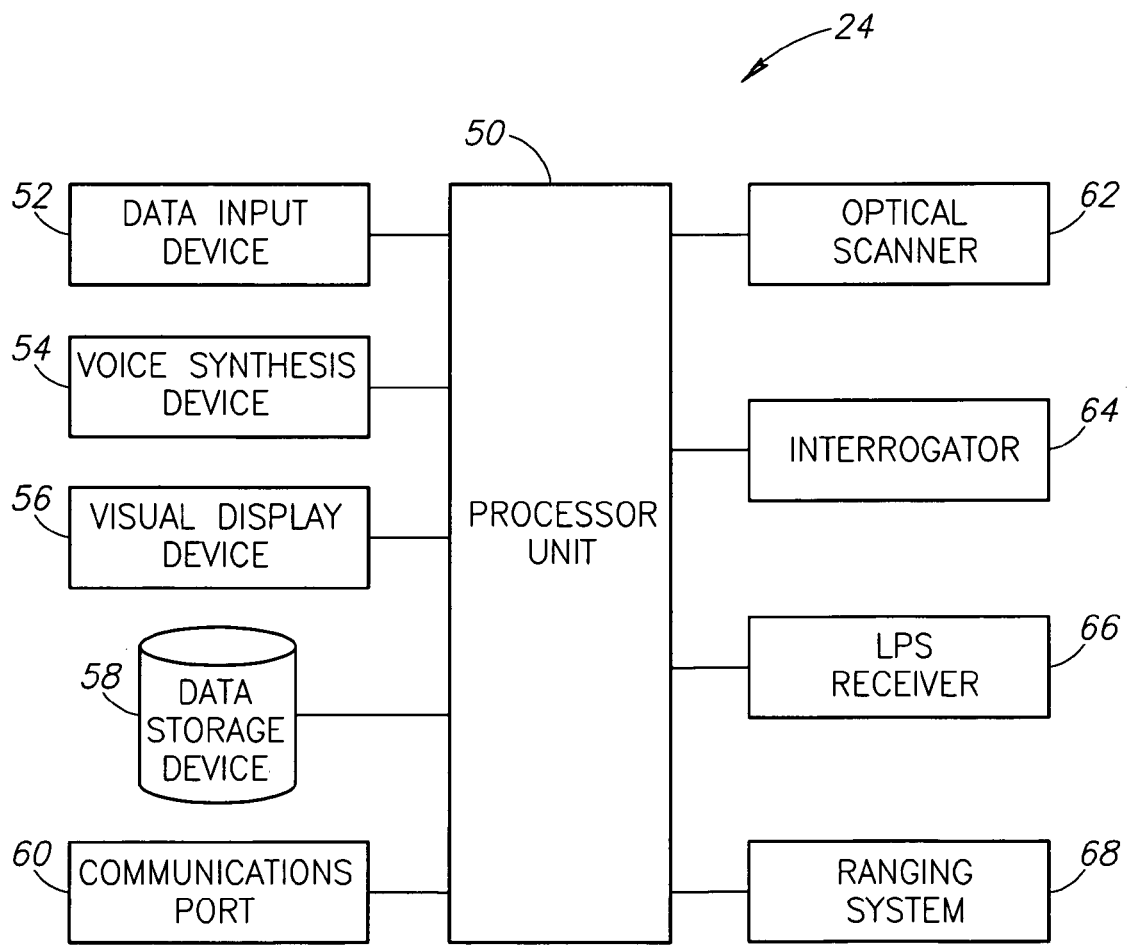
FIG. 3 is a block diagrammatic view of the multifunction device of FIG. 1, according to still another embodiment of the invention.

FIG. 3 is a diagrammatic view of the multifunction device 24 of FIG. 1, according to still another embodiment of the invention. The multifunction device 24 includes a processor unit 50 that is operable to manage information communicated to and/or from the multifunction device 24. Accordingly, the processor unit 50 may include any programmable electronic device that is configured to receive programming instructions and information, and to process the information according to the programming instructions. The processor unit 50 is further coupled to a plurality of external devices that are configured to perform various tasks. Accordingly, the device 24 includes a data input device 52 coupled to the processor 50 that permits user input commands and/or data to be transferred to the processor 50. The data input device 52 may therefore include a keyboard or keypad, a pointing device such as a mouse, or other similar data input devices.

The multifunction device 24 may also include a voice synthesis device 54 that is operable to receive audible commands from a user, and to send corresponding signals to the processor unit 50. Alternately, the voice synthesis device 54 may also accept signals from the processor unit 50 to audibly communicate with a user. The device 24 may also include a visual display device 56 that is operable to receive information from the processor unit 50 and to display the information to a user of the multifunction device 24. Accordingly, the visual display device 56 may include a liquid crystal display (LCD) device, a light emitting diode (LED) display device, a cathode ray tube (CRT) device, or other similar devices.

A data storage device 58 may also be coupled to the multifunction device 24 to store selected information obtained from the component portion 14 (FIG. 1). Additionally, the data storage device 58 may also be used to store configuration data that is transferred to the device 24 through the communications port 60. Accordingly, the data storage device 58 may include a magnetic disk storage device, or, in another particular embodiment, a solid-state memory device, such as a flash memory device, which may include an USB-compatible flash drive. In another particular embodiment, the data storage device 58 may be a removable flash media card, such as the SMART MEDIA card, available from Toshiba Corporation of Tokyo, Japan. In other particular embodiments, the data storage device 58 may include a PCMCIA memory card, although other suitable solid-state memory devices may be used.

The multifunction device 24 may also include a communications port 60 that is operable to support communications between the processor unit 50 and an external communications system (not shown), which may be coupled to still other processing devices and/or data storage devices. The communications port 60 may be configured to exchange information with the communications system (not shown) using a universal serial bus (USB) communications protocol, or by using other suitable communications protocols. For example, the communications port 60 may be configured in accordance with IEEE 1394, and commercially known as FIRE WIRE, in order to communicate information between the processor unit 50 and other processing devices and/or data storage devices.

Still referring to FIG. 3, in this embodiment, the multifunction device 24 includes an optical scanner 62 that is operable to scan an image and to translate information present in the scanned image into a suitable form. Accordingly, the optical scanner 62 may be configured to distinguish images that include alphanumeric characters, or to distinguish a graphical image that may include predetermined geometrical shapes, colors and/or continuous tones according to a gray scale. In a particular embodiment, the optical scanner 62 is configured to read a bar code graphical image.

The multifunction device 24 includes an interrogator 64 that is operable to communicate with the transponder device 44 (FIG. 2). In general, the interrogator 64 is configured to transmit an appropriate signal to the transponder device 44 to activate the transponder device 44. The transponder device 44 then transmits a responsive signal to the interrogator 64 that identifies the transponder device 44. Accordingly, the interrogator 64 may identify a selected transponder device 44 from a plurality of transponder devices 44 positioned within the article of manufacture 16. Additionally, the interrogator 64 is operable to communicate information to a memory device coupled to the transponder device 44. For example, the memory device may be used to store maintenance information for a selected component, service records for the component, an installation date for the component, an identity of a person installing and/or servicing the component, service bulletin incorporation dates and/or service bulletin information, in addition to other similar component-related information. In one specific embodiment, the information stored in the memory device is formatted in accordance with the SPEC 2000 Standard, Chapter 9, as revised, available from the Air Transport Association, Inc. of Washington, D.C.

As discussed above, the memory device may be read and/or write protected. The processor unit 50 may thus prompt a user to enter an authorization code, such as a password, through the data input device 52 so that the memory device may be write enabled. Subsequent to authorization, information may be read from the data storage device 58 and transferred by the interrogator 64 to the transponder device 44. Alternately, if the selected transponder device 44 is read protected, the authorization code allows a user to read-enable the memory device, so that the processor 50 may read selected information from the memory device coupled to the transponder device 44.

The interrogator 64 may also be configured to operate in a search mode, wherein a selected one of the interrogator 64 and the processor unit 50 is suitably programmed to review the plurality of transponder devices 44 positioned on the article of manufacture 16 and to display pertinent information regarding each of the transponder devices 44 on the visual display device 56. When a desired one of the plurality of transponder devices 44 is displayed, the user may select the transponder device 44 depicted on the display device 56 for selected reading and/or writing operations.

A local positioning system (LPS) receiver 66 is also coupled to the processor unit 50. The LPS receiver 66 is configured to receive signals from the LPS system 12 (shown in FIG. 1), and determine a position of the receiver 66 based upon the received signals. In general, the LPS system 12 determines the position of the receiver 66 using a plurality of antennas 20 that are mutually spaced apart. Upon receipt of pulsed signals 22 (FIG. 1) from the LPS system 12, the receiver 66 computes a time-of-flight (TOF) value, and computes the position of the receiver 66 by triangulation of the TOF values.

The multifunction device 24 may also include a ranging system 68 that is operable to determine a distance between the ranging system 68 and a selected object. In one particular embodiment, the ranging system 68 includes a laser range finder apparatus, which generally includes a pulsed laser light source and a receiver operable to detect a reflected light pulse so that a corresponding time-of-flight (TOF) interval is measured. A microcontroller or other programmed processor may be provided to calculate a distance based upon the measured TOF interval. In another particular embodiment, the ranging system 68 includes an ultrasonic range finder apparatus that includes a pulsed acoustic source that is operable to emit narrowly-focused acoustic energy at ultrasonic frequencies and an acoustical receiver that is operable to detect reflected acoustic energy. A microcontroller or other programmed processor may also be provided to calculate a distance based upon the measured TOF.

Figure 4:
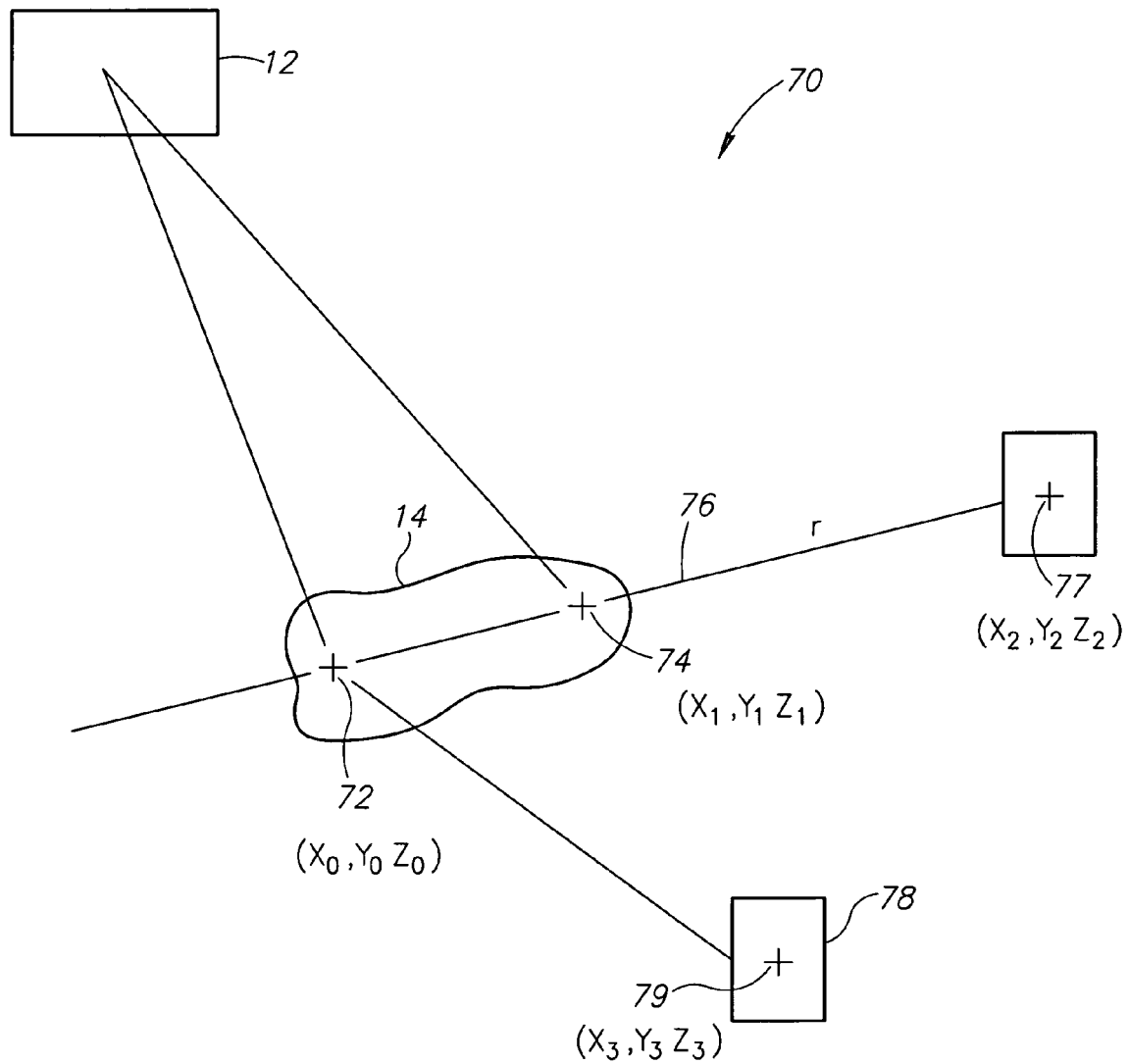
FIG. 4 is a diagram that is used to describe a method for spatially locating a component according to another embodiment of the invention.

FIG. 4 is a diagram that will be used to describe a method 70 for spatially locating a component 14 (shown in FIG. 1), according to another embodiment of the invention. A first spatial point 72 and a second spatial point 74 may be determined relative to the LPS system 12 using the LPS receiver 66 of the multifunction device 24 (shown in FIG. 3). Based upon the first point 72 and the second point 74, a line 76 may be calculated by the processor 50 (also shown in FIG. 3) that extends through the first point 72 and the second point 74. The line 76 may be used to determine the location of a third spatial point 77. The third spatial point 77 may be located adjacent to a fixed structural portion of the article of manufacture 16. When the multifunction device 24 is positioned at the third spatial point 77, the ranging system 68 of the multifunction device 24 may be used to determine a distance "r" between the third spatial point 77 and the component 14. The component 14 may thus be spatially located by locating the multifunction device 24 at the third spatial point 77 and projecting along the line a distance "r".

With reference still to FIG. 4, and in another specific method 70 for spatially locating a component 14, at least one of the spatial points 72 and 74 associated with the component 14 is determined (relative to the LPS 12) and stored in the data storage device 58 associated with the multifunction device 24 (FIG. 3). A spatial point 79 that is positioned on a portion of the article 16 is then determined (also relative to the LPS 12) using the multifunction device 14 and stored in the data storage device 58. The spatial point 79 may thus be employed as a datum point that is coupled to the article 16, and the spatial points 72 and 74 associated with the component 14 may be referenced to the datum point by a suitable coordinate transformation. A remotely positioned LPS transmitter 78 that emits positioning signals may then be coupled to the datum point so that spatial points may be referenced to the datum point. Accordingly, the position of the component 14 may be determined using positional information stored within the multifunction device 24 when the article 12 is moved to a physical location that is beyond the operational range of the LPS 12.

Figure 5:
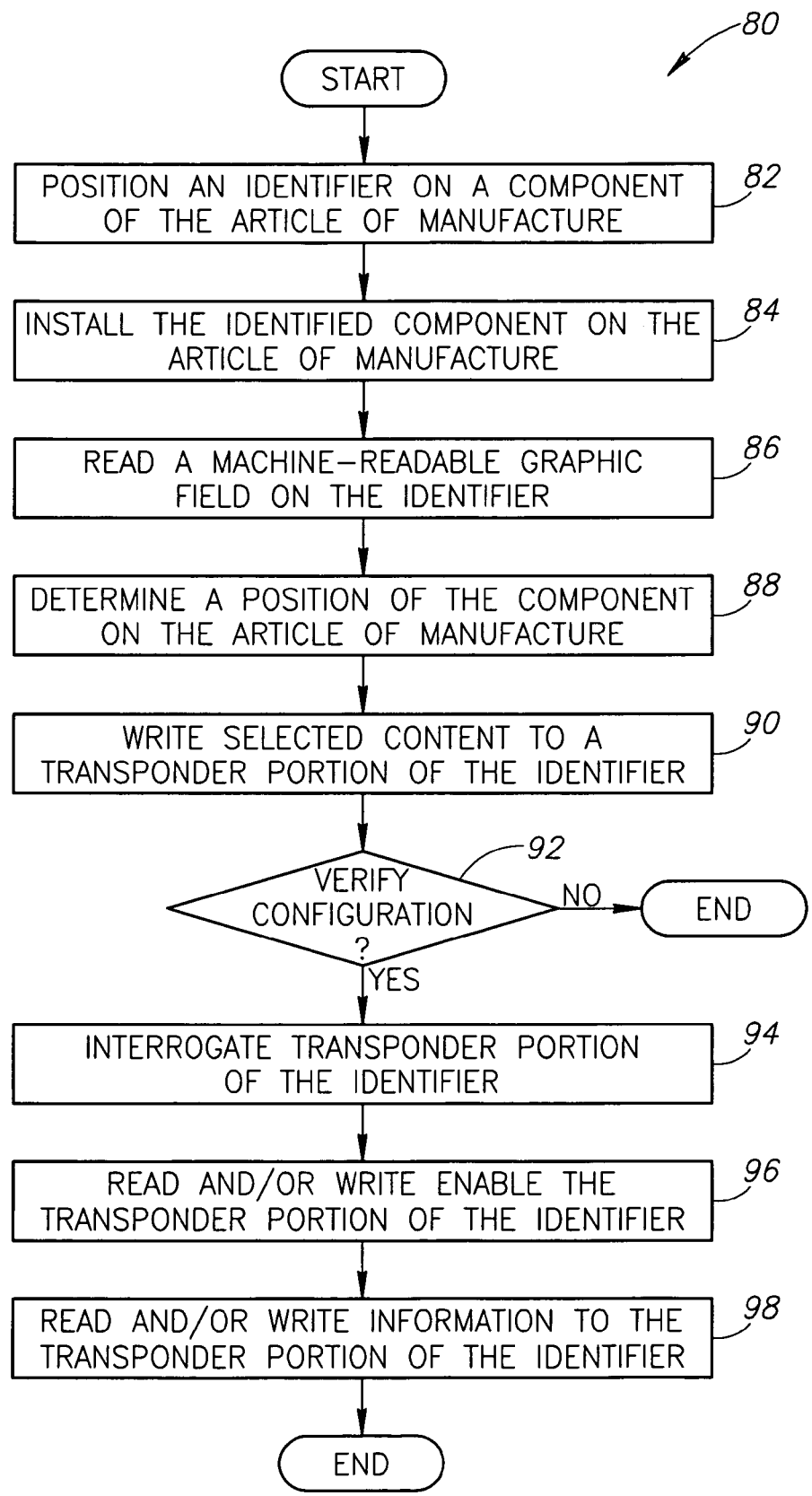
FIG. 5 is a method of managing a configuration of an article of manufacture, according to another embodiment of the invention.

FIG. 5 is a method 80 of managing a configuration of an article of manufacture, according to another embodiment of the invention. With reference also to FIG. 1, an identifier 26 is positioned on a component portion 14 of the article of manufacture 16 at block 82. Alternately, the identifier 26 may be attached to the component portion 14 prior to installation on the article of manufacture 16. The identifier 26 may be adhesively attached to the component portion 14, or it may be attached to the component portion 14 by other suitable methods. At block 84, the component portion 14 that includes the identifier 26 is installed on the article of manufacture 16. At block 86, a machine-readable graphic field 42 (FIG. 2) present on the identifier 26 is read by the optical scanner 62 of the multifunction device 24 (FIG. 3). The machine-readable graphic field 42 provides identifying information to the multifunction device 24 regarding the component portion 14. For example, the machine-readable graphic field 42 may include a part number, a serial number, or other similar information pertaining to the component portion 14. At block 88, a position of the component portion 14 is determined after installation on the article of manufacture 16. The position of the component portion 14 is determined by receiving signals from the LPS system 12 using the LPS receiver 66 of the multifunction device 24 (FIG. 3) and processing the signals in the processor unit 50 to determine the position relative to a selected coordinate system. At block 90, selected content is written to the transponder portion 42 of the identifier 26. The selected content may include, for example, an identity of an individual installing the component portion 14, drawings, specifications, service bulletins or maintenance records pertaining to the component portion 14. At block 92, if it is desired to verify a configuration of the article of manufacture 16, the multifunction device 24 interrogates the transponder portion 44 of the identifier 26, as shown in block 94. The transponder portion 44 may be interrogated by indicating a particular identity of the component portion 16, the transponder portion 44, or other suitable criteria. Alternately, the multifunction device 24 may scan a plurality of identifiers 26 positioned on the article of manufacture 16 so that a user may select a desired component portion 14. Following the interrogation at block 94, the transponder portion is read and/or write enabled at block 96, and information may be read and/or written to the transponder portion at block 98.

Embodiments of the present invention may provide significant advantages over the prior art. For example, configuration management may be accurately and efficiently performed by simply bringing an article of manufacture within proximity of a system for documenting a configuration of an article of manufacture. The system may then scan the article of manufacture, receiving and recording information from all of the identifiers that are present within the article of manufacture to accurately and efficiently develop an electronic record of the product configuration of the article of manufacture. In addition, information may be written to a memory associated with the identifier to store maintenance information for a selected component, service records for the component, an installation date for the component, an identity of a person installing and/or servicing the component, service bulletin incorporation dates and/or service bulletin information, among other pertinent information. In particular, the information stored in the memory is formatted in accordance with the SPEC 2000 Standard, Chapter 9, as revised.

Thus, embodiments of the present invention may greatly reduce the labor and expense associated with management of the product configuration, and may also reduce or eliminate paper-based documentation. Furthermore, because embodiments of the present invention may be used to determine the coordinate locations of all of the components within the article of manufacture, the electronic record of the article of manufacture may also provide the physical locations of the components within the article of manufacture. This information may advantageously assist with repair and replacement of components within the article of manufacture, and may thereby reduce the labor and expense associated with maintenance and repair activities.

Figure 6:
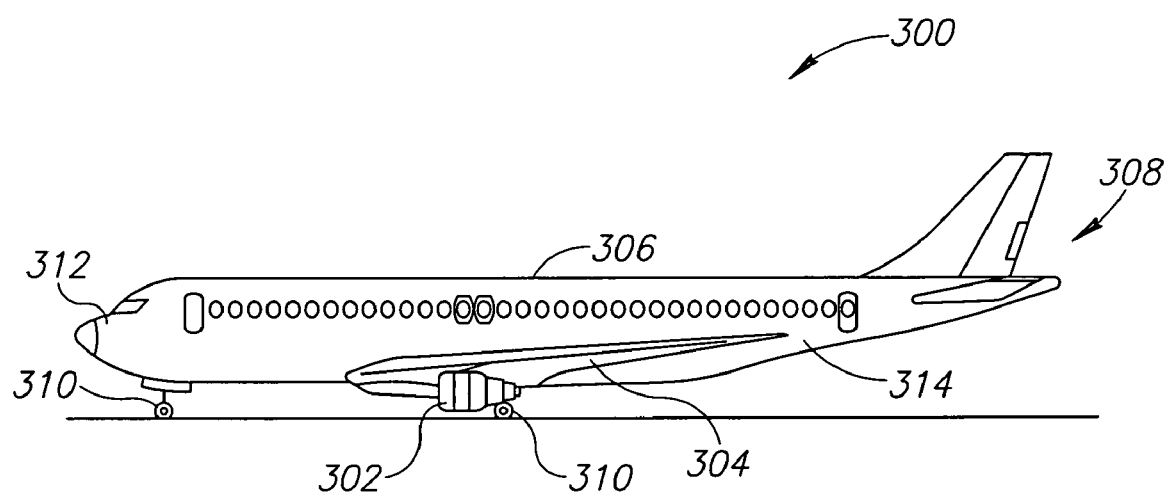
FIG. 6 is a side elevation view of an aircraft having one or more of the disclosed embodiments of the present invention.

Embodiments of the invention may be incorporated into a wide variety of manufactured articles. Referring now in particular to FIG. 6, a side elevation view of an aircraft 300 having one or more of the disclosed embodiments of the present invention is shown. The aircraft 300 generally includes one or more propulsion units 302 that are coupled to wing assemblies 304, or alternately, to a fuselage 306 or even other portions of the aircraft 300. Additionally, the aircraft 300 also includes a tail assembly 308 and a landing assembly 310 coupled to the fuselage 306. The aircraft 300 further includes other systems and subsystems generally required for the proper operation of the aircraft 300. For example, the aircraft 300 includes a flight control system 312 (not shown in FIG. 6), as well as a plurality of other electrical, mechanical and electromechanical systems that cooperatively perform a variety of tasks necessary for the operation of the aircraft 300.

With reference still to FIG. 6, the aircraft 300 may include one or more of the embodiments of the system of configuration management 314 according to the present invention, which may operate in association with the various systems and sub-systems of the aircraft 300. In particular, the various components of the aircraft 300 may include the identifier 26, as shown in FIG. 1 and FIG. 2, which cooperatively communicates with the system 10 of FIG. 1.

The aircraft 300 shown in FIG. 6 is generally representative of a commercial passenger aircraft, which may include, for example, the 737, 747, 757, 767 and 777 commercial passenger aircraft available from The Boeing Company of Chicago, Ill. It is understood, however, that in alternate embodiments, systems for product configuration management in accordance with the invention may be used with other types of flight vehicles, terrestrial vehicles, ships, and virtually any other type of product or article of manufacture. Examples of suitable flight vehicles include manned and unmanned military aircraft, rotary wing aircraft, satellites, spacecraft, and ballistic flight vehicles, including those flight vehicles illustrated in Jane's All The World's Aircraft, available from Jane's Information Group, Ltd. of Coulsdon, Surrey, UK.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely by reference to the claims that follow.

What is claimed is:

1. A system for documenting a configuration of an aircraft, the aircraft including a plurality of components, the system comprising:
   a plurality of identifiers attached to the aircraft components;
   a local positioning system for determining positional locations of the identifiers relative to a coordinate system and, therefore, installation positions of the components in the aircraft; and
   apparatus for interactively communicating with the identifiers and the local positioning system, the apparatus storing configuration information about the components in the identifiers.

2. The system of claim 1, wherein each identifier further comprises at least one of a machine and optically readable graphic field, an alphanumeric field and a transponder device.

3. The system of claim 2, wherein at least one identifier includes a transponder device having one of an active radio frequency identification device (RFID), a passive RFID and an infrared identification device (IRID).

4. The system of claim 3, wherein the transponder device further comprises one of a read-only memory device and memory device configured for read and write operations and operable to store information related to the aircraft.

5. The system of claim 2, wherein the machine and optically readable graphic field further comprises a bar code.

6. The system of claim 1, wherein the local positioning system includes one or more radio frequency (RF) devices that determine the positional location of an identifier using one of a time difference of arrival (TDOA), angle of arrival (AOA), time of arrival (TOA) and received signal strength (RSS) methods.

7. The system of claim 1, wherein the apparatus includes a processor unit and memory for storing configuration information.

8. The system of claim 7, wherein the apparatus further includes at least one or more of a data input device, a voice synthesis device and a visual display device coupled to the processor unit.

9. The system of claim 7, wherein the apparatus further includes a receiver coupled to the processor unit that is operable to receive radio frequency (RF) signals from the local positioning system.

10. The system of claim 7, wherein the apparatus further comprises an optical scanning device coupled to the processor unit that is operable to read an optically readable graphic field, and an interrogator device coupled to the processor unit that is operable to communicate with a radio frequency (RF) transponder positioned in the identifier.

11. The system of claim 1, further comprising a ranging system for determining distance from the local positioning system to the identifiers.

12. A system comprising a plurality of aircraft components; and the aircraft configuration documenting system of claim 1 for determining locations of the components and storing configuration information about the components in the identifiers.

13. A system comprising:
a plurality of installed aircraft components,
a plurality of identifiers corresponding to the components, each identifier positioned on its corresponding component, each identifier including memory for storing configuration information about its corresponding component, each identifier further including means for remotely accessing the memory; and
apparatus for documenting presence, position and status of the aircraft components, the apparatus remotely interrogating the identifiers and communicating with the identifiers to determine installation position of each component with respect to a coordinate system, and also to store configuration information about the components in the corresponding identifiers, the configuration information including at least one of "as flying" and "as delivered" configuration information.

14. The system of claim 13, wherein the apparatus for documenting the presence and status of the aircraft components includes "as flying" configuration information for at least some of the identifiers.

15. The system of claim 13, wherein the apparatus includes a local positioning system to determine location of the identifiers and the installation positions of the components in the aircraft.

* * * * *